U. C. LONG.
YOKE.
APPLICATION FILED FEB. 7, 1921.
1,403,427.
Patented Jan. 10, 1922.
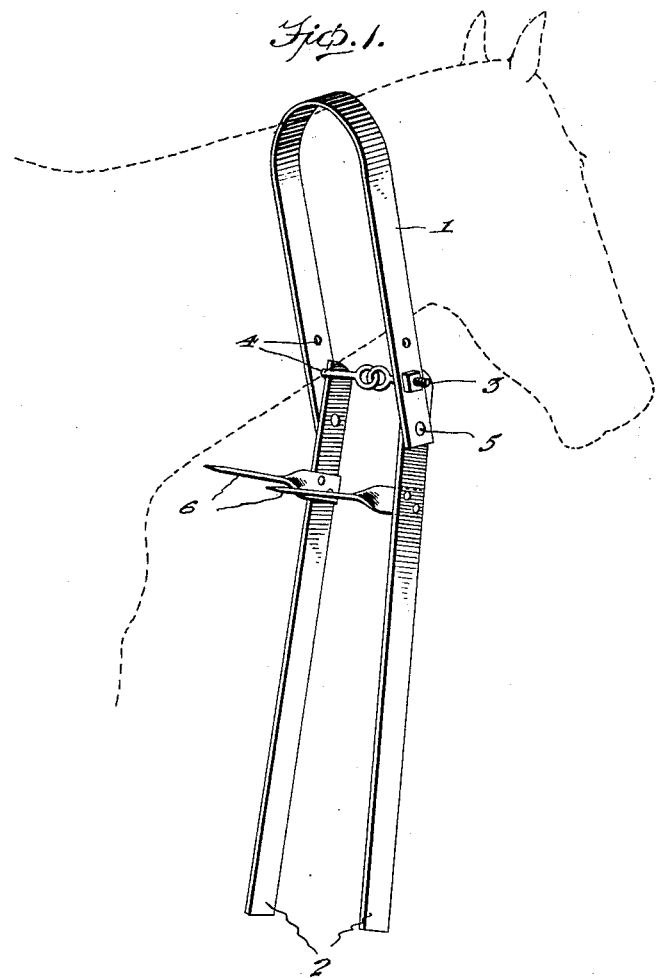
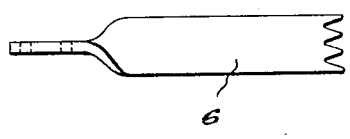
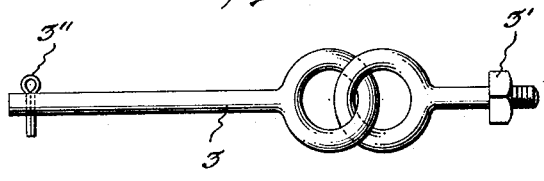
U. C. Long INVENTOR
BY Victor J. Evans ATTORNEY
WITNESS:
Paul M. Hunt
L. B. Middleton

UNITED STATES PATENT OFFICE.

ULY C. LONG, OF SOUTH WHITLEY, INDIANA.

YOKE.

1,403,427.    Specification of Letters Patent.    Patented Jan. 10, 1922.

Application filed February 7, 1921. Serial No. 443,165.

*To all whom it may concern:*

Be it known that I, ULY C. LONG, a citizen of the United States, residing at South Whitley, in the county of Whitley and State of Indiana, have invented new and useful Improvements in Yokes, of which the following is a specification.

This invention relates to yokes for preventing animals from passing through or jumping over fences, the principal object of the invention being to provide movable arms for the yoke which will permit the animal to graze but when brought against the fence wires will be pressed against the animal so that spurs on said arms will stick into the animal and thus cause it to back away from the fence.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view showing how the device is placed on the neck of an animal.

Figures 2 and 3 are detail views.

As shown in these views the device consists of the U-shaped member 1 and the arms 2. The member 1 is placed over the neck of the animal, as shown in Figure 1, and is held in place by the rods 3 which pass through the holes 4 in the member 1 adjacent the ends thereof. The inner ends of these rods 3 are provided with eyes which engage each other as shown. One of these rods 3 is held in place by the nut 3' while the other one is prevented from being pulled through the hole 4 by the pin 3". I provide a plurality of the holes 4 so that the device can be adjusted to fit various sizes of animals. The arms 2 are pivotally secured to member 1 by means of the bolts 5 passing through holes in said arms and through some of the holes 4 in member 1. Each arm carries a rearwardly extending spur 6 and the upper end of each arm is adapted to strike the rod 3 so as to limit its forward swinging movement. However, these arms can swing rearwardly as will be understood.

The spurs are each formed from a flat piece of iron twisted, as shown, so that when it is riveted to the arms the broad side will face the breast of the animal. The spurs are fastened on the inside of the arm so that they will not interfere with the adjustment of the arms on the U-shaped member.

From the above it will be apparent that when the device is placed upon the neck of an animal and the animal is grazing the arms 2, when brought in contact with the ground, will swing inwardly and upwardly so as to not interfere with the grazing of the animal. However, if the animal should attempt to pass through the fence the arms 2 striking the wires of the fence would be pressed inwardly so that the spurs 6 will prick the animal and thus cause it to back away from the fence.

If the animal should walk up to the fence with his head up the arms of the yoke would extend downwardly at an incline towards the animal's breast so that the arms would swing towards the animal's breast and thus prevent said arms from hooking in the top wire of the fence.

When the rods 3 are placed in the top pair of holes the bolts of the arms are placed in the second pair and when the rods are placed in said second pair the bolts of the arms will be placed in the third pair.

If an animal should run up against the fence with force, the movable arms would let the spurs strike the animal and then would swing upward instead of straight back and would not be so liable to blemish the animal.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising a yoke, means for flexibly connecting the ends of the yoke together, an arm pivoted to each end of the yoke and having a part engaging the connecting means for limiting the outward swinging movement of the said arm and inwardly extending spurs on the arms for pricking the animal when the arms are swung inwardly.

In testimony whereof I affix my signature.

ULY C. LONG.